United States Patent Office 3,295,188
Patented Jan. 3, 1967

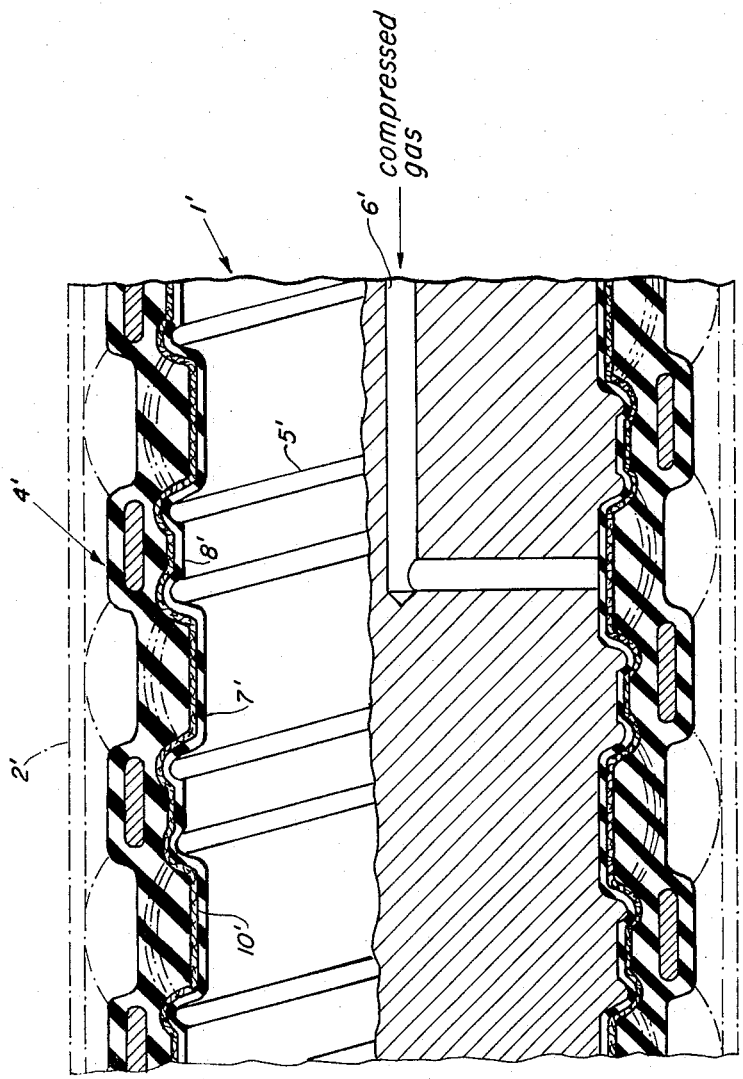

3,295,188
SELF-CENTERING PRESSURE ROLLER
Hans Saueressig, Wullen, Kreis Ahaus, Westphalia, Germany, assignor to Gebr. Saueressig K.G. Maschinenfabrik, Wullen, Kreis Ahaus, Westphalia, Germany, a corporation of Germany
Filed Mar. 11, 1966, Ser. No. 533,694
Claims priority, application Germany, June 30, 1965, S 97,907
6 Claims. (Cl. 29—113)

This application is a continuation-in-part of my copending application Ser. No. 326,970 filed November 29, 1963, now Patent No. 3,253,323 issued May 31, 1966.

In my prior application I have disclosed a pressure roller, e.g. as used for printing, embossing, calendering or conveying sheet material and the like, wherein a cylindrical sleeve removably surrounds a driven shaft with annular clearance, this clearance being occupied by a continuous clutch body which includes a plurality of inflatable cushion sections alternating with noninflatable sections by which the body is positively secured to the shaft. The cushion sections are inflatable by pressure fluid admitted via one or more conduits, preferably extending within the shaft itself, into the spaces between the shaft periphery and the inner body wall so that these sections bulge outwardly and engage the surrounding sleeve after the latter has been moved into telescopic relationship with the shaft in the deflated condition of the body. Advantageously, as also taught in my prior application, the deformable body is reinforced by a tubular insert of flexible but substantially inextensible material, such as a textile inlay of the type conventionally used in automotive tires, which is imbedded in the preferably elastomeric material of the body and which may be supplemented by imbedded clamping rings or the like holding the noninflatable body sections in firm contact with the shaft; the latter sections may also, alternatively or additionally, be adhesively bonded (e.g. by vulcanization) to the shaft or secured to it in some other convenient manner.

The arrangement just described affords satisfactory torque transmission between the shaft and the sleeve during operation and facilitates assembly and disassembly of the parts when the system is not in use. Thus, it permits the removal of the outer sleeve and its replacement by another sleeve of different external dimensions and/or markings whereby, in the case of a printing cylinder or embossing roller, quick changes can be made in the design to be reproduced. By the same token, a defective sleeve can be easily replaced.

Particularly in the case of relatively strong and/or uneven external pressures, however, the sleeve does not invariably retain its coaxial relationship with the driving shaft as the interposed inflatable supporting body undergoes eccentric deformation. The general object of my present invention is to provide means in such pressure roller for effectively resisting this deformation and minimizing any departure of the sleeve from its coaxial position.

This object is realized, in accordance with my present invention, by the provision of axially spaced ribs on the shaft to engage the noninflatable body sections at points whose distance from the shaft axis is greater than the shaft radius in the region of the inflatable cushion section but is less than the inner radius of the sleeve diminished by the thickness of the body in the region of the noninflatable sections so that the cushion sections, which in their inflated stage bulge out beyond the interleaved noninflated or shaft-engaging sections, can drop back into the spaces between the ribs, with inversion of their curvature, upon evacuation of the pressure fluid from these spaces. At the same time, the inextensible insert described in my prior application is given an undulating outline so as to have small-diameter portions imbedded in the noninflatable sections, the latter sections limiting the outward bulging of these cushion sections so as to resist a noncircular deformation of the inflated body, thereby tending to center the sleeve on the shaft.

Advantageously, in accordance with a further feature of my present invention, some of the cushion sections may be made heavier than others, i.e. their thickness as measured between the inextensible insert and the outer body surfaces may be increased, so that the insert is somewhat slacker in the region of these sections than in the remaining cushion sections whose thickness is reduced and whose outer diameter, in the fully inflated stage, substantially corresponds to the inner diameter of the sleeve. The heavier cushion sections, which I prefer to dispose approximately midway around the shaft, thus afford increased frictional coupling between the sleeve and the body while the reduced cushion sections constitute an almost rigid support for the extremities of the sleeve, thereby preventing its wobbling on the shaft.

The ribs engaging the noninflatable body sections may be annular and mutually separated or may constitute portions of a continuous helicoidal ridge. They could, in either case, form pairs flanking the noninflatable body sections so as positively to prevent any axial shifting of the body with reference to the shaft even in the absence of adhesive bonding.

The invention will be described in greater detail with reference to the accompanying drawing in which:

FIG. 3 is a fragmentary sectional view similar to FIGS. 1 and 2, illustrating a modification.

Figure 1:
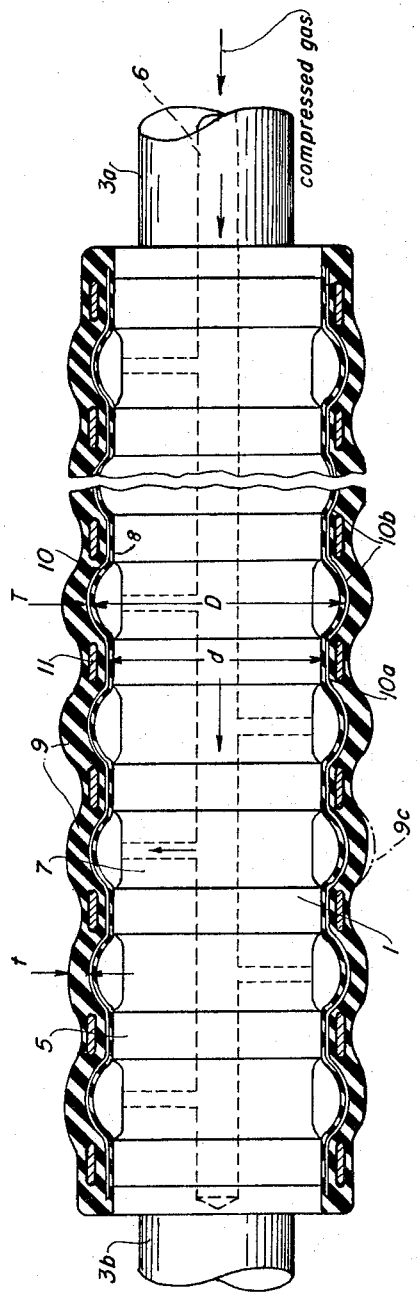
FIG. 1 is a longitudinal sectional view of an inflatable clutch body according to the invention, mounted on a shaft and shown in its inflated state but without a cooperating sleeve.
Figure 2:
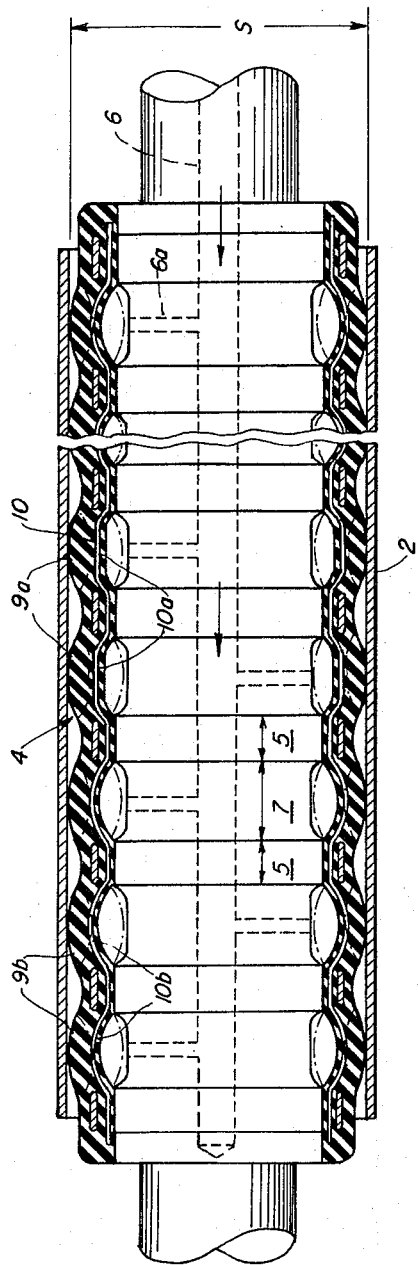
FIG. 2 is a view similar to FIG. 1, showing the associated sleeve in position.

In FIGS. 1 and 2 I have shown a shaft 1 whose extremities 3a, 3b form reduced gudgeons and which is provided at axially spaced locations with a series of annular ribs 5 separated by zones 7 of smaller diameter. A fluid channel 6 extends axially within the shaft 1 and has a number of branch channels 6a opening into the spaces 7.

A continuous tubular body 4, of rubber or other elastomeric material, surrounds the ribbed portion of shaft 1 and is subdivided into annular cushion sections 9 alternating with noninflatable shaft-engaging sections 8 which are in all-around contact with respective ribs 5 and may be adhesively secured thereto, e.g. by vulcanization. Annular clamps 11, imbedded in the material of body 4, maintain the connecting sections 8 in close contact with the ribs 5 of the shaft.

A tubular insert in the form of a textile inlay 10 is also imbedded in body 4 and extends close to the inner periphery thereof, inside the clamping rings 11. This insert 10 is of undulating profile and thus consists of small-diameter sections 10a alternating with large-diameter sections 10b, the respective diameters of these sections having been designated d and D. The thickness t of body 4, measured from its outer periphery to the location of inlay 10, is so chosen that the sum $D+2t$ is substantially equal to the inner diameter S of a rigid cylindrical sleeve 2 adapted to be shoved onto the body 4 in the deflated condition of the latter. At certain locations, specifically in the central region of shaft 1, the cushion sections 9 are of a larger thickness T so that the fabric 10 in these sections is not stretched to its full diameter D when the body 4 is inflated against the sleeve 2 as shown in FIG. 2. Thus, this body will then include cushion sections 9a which, upon the admission of compressed air or other fluid into the channel 6, will be urged rather firmly against the inner wall of sleeve 2 by the pneumatic pressure prevailing in the corresponding spaces 7, with the associated inlay portions 10a in a relatively slackened state, and will further include other cushion sections 9b whose inlay sections 10b are stretched to the limit of their diameter D and which therefore act with less friction but with greater geometric stability upon the contacting sleeve wall.

The thinner wall portions of cushion sections 9b can be produced, in the fully inflated state of body 4, by machining the outer surface of these portions as indicated at 9c in FIG. 1.

Upon release of the fluid pressure in channel 6, body 4 collapses into the spaces 7, with inversion of curvature of its portions 9 and of inlay sections 10a, as has been illustrated dot-dash lines in FIG. 2. The sleeve 2 may then be readily removed from the shaft 1 for inspection, repair, or replacement by another sleeve of similar inner dimensions.

As has been illustrated in FIG. 3, ribs 5' on a shaft 1' may be arranged in pairs to receive between them the non-inflated sections 8' of a clutch body 4' generally similar to body 4 of FIGS. 1 and 2. FIG. 3 also illustrates that the ribs, instead of being annular as in the preceding embodiment, could be helically shaped so as to form part of continuous threadlike ridges, the connecting sections 8' having of course the same helical configuration; in this case, in which the spaces 7' between the rib pairs all communicate with one another when the body 4' is inflated, it will suffice to provide a single radial branch from central feed channel 6' although, if desired, additional branches could also be drilled into the shaft 1'.

In FIG. 3 I have shown the body 4' in its deflated state (full lines), the inflated condition having been indicated by dot-dash lines along with the position of a sleeve 2' held in place by the inflated body. Again, as described above, the cushion sections (here helical) of the clutch body and the large-diameter portions of its insert 10' (also helical) invert their curvature upon a changeover from the inflated to the deflated state or vice versa.

Naturally, the selective thickening of certain cushion sections for increased frictional coupling, described in connection with FIGS. 1 and 2, may also be adopted in the arrangement of FIG. 3.

It will thus be apparent that the substantially nonextensible insert 10 or 10' acts as a stabilizing means which resists deformation of the inflated body 4 or 4' and tends to maintain the engaged sleeve 2 or 2' in precisely coaxial relationship with its carrier shaft 1 or 1'.

The admission of fluid into the channel 6 or 6' and the subsequent venting of this channel may be accomplished with the aid of suitable valves, e.g. as described in my above-identified prior application and patent.

I claim:
1. A pressure roller comprising a shaft connectable to a source of motive power, a cylindrical sleeve removably surrounding said shaft with annular clearance, a continuous body including a plurality of inflatable cushion sections disposed in said clearance at axially spaced locations for frictionally connecting said shaft with said sleeve, said body further including noninflatable sections between said cushion sections and being positively secured to said shaft by said noninflatable sections for enabling removal of said sleeve from said shaft in a deflated condition of said cushion sections, and conduit means for concurrently inflating said cushion sections by admitting a fluid under pressure into same, said body having imbedded therein a tubular insert of flexible but substantially inextensible material and of longitudinally undulating outline, said shaft being formed with axially spaced ribs engaging said noninflatable sections, said conduit means opening into the spaces between said ribs, said ribs registering with small-diameter portions of said insert imbedded in said noninflatable sections, said spaces registering with large-diameter portions of said insert which are imbedded in said cushion sections and limit the outward bulging of the latter while enabling said cushion sections to drop into said spaces with inversion of curvature of said large-diameter portions upon a release of the pressure of said fluid.

2. A pressure roller as defined in claim 1, further comprising annular clamping means aligned with said ribs and imbedded in said noninflatable sections for holding the latter against said shaft, said clamping means surrounding said insert.

3. A pressure roller as defined in claim 1 wherein certain of said cushion sections are of reduced thickness between said insert and the outer surface of said body, as compared with other of said cushion sections, whereby upon inflation of said body against said sleeve said insert is slacker in said other of said sections than in said certain of said sections.

4. A pressure roller as defined in claim 3 wherein said certain of said sections are disposed at the extremities of said body, said other of said sections being disposed near the center of said body.

5. A pressure roller as defined in claim 3 wherein the diameter of said large-diameter portions of said insert substantially equals the iner diameter of said sleeve reduced by double the thickness of said certain of said cushion sections whereby said body in its inflated state is substantially incapable of further outward deformation in the region of said certain of said sections.

6. A pressure roller as defined in claim 1 wherein said body consists of elastomeric material and said insert is a textile inlay wholly surrounded by said material.

References Cited by the Examiner
UNITED STATES PATENTS

| | | | |
|---|---|---|---|
| 2,849,192 | 8/1958 | Fairchild | 242—72 |
| 2,876,961 | 3/1959 | Cole et al. | 242—72 |
| 3,006,277 | 10/1961 | Willard | 29—113 XR |
| 3,046,637 | 7/1962 | Kusters et al. | 29—113 |
| 3,096,949 | 7/1963 | Huffman | 29—113 X |

BILLY J. WILHITE, *Primary Examiner.*